3,516,832
PHOTOGRAPHIC ARTICLES AND MATERIALS USEFUL IN THEIR MANUFACTURE
Howard F. Earhart, Frederick J. Jacoby, and Clemens B. Starck, Rochester, N.Y., assignors to Eastman Kodak Company, Rochester, N.Y., a corporation of New Jersey
No Drawing. Filed Nov. 25, 1966, Ser. No. 596,803
Int. Cl. G03c 1/76
U.S. Cl. 96—87                     1 Claim

ABSTRACT OF THE DISCLOSURE

This development relates to film materials that are especially adapted for use as photographic film units in film packs which in turn are preferably adapted for development outside the camera. The photographic films for this invention are comprised of a black film base having on one surface thereof a layer containing spherical polymeric beads, carbon black and low viscosity cellulose nitrate (to provide improved adhesion to the film base). Optionally, on the other surface is a white layer containing titanium dioxide pigment and low viscosity cellulose nitrate, a gel sub layer, and finally a photographic emulsion. This particular application is directed to the photographic film element.

---

In certain photographic applications, it is advantageous to remove exposed film from a camera and then simultaneously develop and "print" an appropriate photograph either immediately or within a very short time thereafter; this development and printing being done outside of the camera. Illustrative of this type of photographic process is the well-known "photograph-in-a-minute" (or even less time) involving a so-called "film unit" that (after the negative has been exposed in the camera), upon being removed from the camera, development of both the negative and positive images are automatically activated by the manner of removal from the camera, and after a short time, the positive "print" or photograph (in color or black and white) can then be stripped from the "film unit" as a practically finished photographic product.

Generally film is supplied for this type of application in the form of eight or more individual "film units" as a "film pack," the individual "film units" being tightly arranged so that, after exposure of the first such "film unit," that "film unit" can be pulled from the camera (for external development, as described heretofore), thereby positioning the next "film unit" in line for exposure. In order for the requisite spacial relationships of the various parts that must cooperate as the final "film units," it has been found that the most desirable situation involves the following:

(1) A black film base, which can be any conventional material that is useful as a base or foundation for a photographic film element such as black polyester sheet or black cellulose ester sheet for example, poly(ethylene terephthalate) or cellulose acetate having a very high optical density (of at least about 7, measured on a 3.5 mil film, so that they are practically impermeable to light) due to the presence therein of dark pigment such as carbon black. Particularly preferred for this particular use are black acetate films such as those described in detail in presently copending U.S. patent application, Ser. No. 537,283, filed Mar. 25, 1966, now Pat. No. 3,376,149. Actually, any light impervious base upon which a conventional light sensitive photographic emulsion can be applied (with or without one or more conventional "sub" layers) can be utilized as the base for the novel film element of the present invention.

(2) On one surface of this black film base is a low-friction, antiblocking, antistatic layer comprised of, by weight, (A) from about 30 to about 55 percent of substantially spherical polymeric beads (to thereby impart to this surface a significantly enhanced "slipping" and "anti-blocking" ability); (B) from about 10 to about 3 percent of low viscosity cellulose nitrate; and (C) from about 25 to about 60 percent of finely divided carbon black (to thereby provide enhanced anti-static properties to this surface of the film element).

(3) Optionally, on the other surface of the film element can be a white layer composed of, by weight, (A) from about 10 to about 25 parts of finely divided titanium dioxide pigment, and (B) from about 2 to about 8 parts of low viscosity cellulose nitrate.

(4) A conventional gel sub layer.

(5) On the white layer, then, can be placed either the light sensitive negative emulsion, or the emulsion coating that is to receive the image from the developed or developing exposed negative (for example, in a conventional contact development process).

Thus, one aspect of the present invention is a light impermeable (preferably black) photographic film base having, on one surface, a coating consisting of slippery polymeric spheres, carbon black, and low viscosity cellulose nitrate (binder). This material has the effective, valuable combination of properties (i.e., good antistatic and antiblocking properties and very low friction) that make possible the economic manufacture of prcatical "film packs," for example.

Another aspect of the present invention is the coated, light impermeable film base having on the other surface a smooth layer of finely divided titanium dioxide pigment in combination with an unexpectedly small amount of low viscosity cellulose nitrate binder. This particular aspect is surprising because it has been discovered that not only is it possible to bind relatively very large amount of titanium dioxide pigment to the black film base with an extremely small amount of this special type of cellulose nitrate, but the use of such unexpectedly small proportions of low viscosity cellulose nitrate binder (as compared to the relatively large amount of pigment in the combination) make possible the use of improved, simplified processing of the resulting white coated film base.

Still another aspect of this invention is the special coating compositions that have been found to be so effective in the manufacture of the coated, special film elements of the present invention.

The "polymeric beads" that have been found useful in the present compositions are those that are essentially organic polymers, are substantially spherical in shape, have average diameters of from about 0.5 to about 25 microns (preferably from about 3 to about 15 microns), and which are practically insoluble in a 30:70 (by weight) mixture of acetone and water, respectively. Examples of polymeric beads that are particularly preferred for this application are the conventional polymethacrylate beads made and modified in accordance with the processes set out in U.S. Pat. 2,701,245 (modified, for example, with divinyl benzene, diethylene glycol diallyl dicarbonate, and the like to reduce the solubility of the beads in organic solvents—they must be essentially insoluble therein), polypropylene beads, poly(tetrafluoroethylene), and polyethylene beads. An advantage of the use of the preferred materials set out above is that essentially no scratching or otherwise evident abrasion is caused by their use. By comparison, the use of materials such as glass, silica, or any of the well-known pigments having the same particle size (in place of the above-described polymeric spheres) causes both undesirable abrasion and the expected increased undesirable friction.

The "low viscosity cellulose nitrate" that is useful in the successful practice of this invention has an intrinsic viscosity (measured at 25° C. in acetone) between about 0.4 and about 1.5, and preferably between about 0.55 and about 0.75. A particularly preferred material is that which is commonly referred to as "½ second cellulose nitrate."

Any finely divided carbon can be utilized in the preparation of the "high slip-antistatic" coating layer of the present invention, so long as its average particle size is below about 40 microns (and preferably below about 5 millimicrons). The only other critical element regarding carbon black usage in the present processes and products relates to the need to utilize fairly large quantities of carbon black in order to provide the requisite antistatic properties in the resulting coating. Thus at least about 25 weight percent (preferably at least about 30%) of the low friction, antistatic coating must be the finely divided carbon.

In order to provide coatings having the necessary extreme uniformity over the entire coated surface, and the desired swift drying characteristics, it has been discovered that the mixtures of polymeric beads, low viscosity cellulose nitrate, and carbon black of this invention must be applied onto the light impermeable film base (which may also have one or more convention subs thereon) from an essentially organic "solvent" system. Thus, at most about 5 weight percent (and preferably below about 1 weight percent) of water can be present in the "black-bead" coating solutions of this invention. In addition, no more than about 10 weight percent (preferably none) of these solvent systems should consist of halogenated organic solvent. The solvent portion of the preferred black-bead coating compositions of this invention consist essentially of mixtures of (a) alcohol type solvents such as ethanol, methanol, isopropanol, and the lower boiling "Cellosolves" (such as "methyl Cellosolve") plus (b) ketones, such as acetone, methyl ethyl ketone, methylisobutyl ketone, etc. (all of these solvents boiling under one atmosphere at temperatures below about 250° F.), wherein the weight ratio of (a) to (b) is generally from about 90:10 to about 20:80, and is preferably from about 75:25 to about 50:50. A typical preferred solvent mixture contains methanol and acetone in a weight ratio of 70:30, respectively. The "solids" portion of these "solvent systems" represents only from about 1 to about 15, and preferably from about 2 to about 10 weight percent of the resulting coating compositions.

In the following examples, all parts given are by weight unless otherwise specified.

EXAMPLE 1

Onto one surface of a sheet of black cellulose acetate film base is coated, at the rate of about 8 pounds per 1000 square feet, a blend of the following compositions—

| Material: | Parts |
| --- | --- |
| Polymethacrylate beads [1] | 10 |
| Carbon black [2] | 12 |
| ½ second cellulose nitrate | 12 |
| Acetone | 300 |
| Methanol | 675 |

[1] Modified with 5% of divinyl benzene.
[2] Average particle size about 100 millimicrons.

The resulting coated sheet is then passed through a conventional drying oven where it is subjected for 2 minutes to a drying temperature of 250° F. This is sufficient to evaporate essentially all of the acetone and methanol from the coating, leaving behind a matte-type coating (approximately .05 mil thick) of beads, cellulose nitrate and carbon black on the acetate sheet.

When subjected to a conventional "friction" test, the test comprises subjecting the coated sheet to an apparatus in which the coated sheet is placed on an inclined plane beneath a standard (¾" x 3" long) wooden block, followed by a gradual increasing of the slope of the inclined plane. The tangent of the angle at which the block begins to slide over the coated sheet is the "friction" value. Lower values mean less friction, the coated sheet yields a value of 0.28. This is considerably less than the "friction" value (of over 0.50) of the sheeting without the bead-black coating and the "friction" value of 0.42 with a plain carbon black coating. Note that the "friction" value for a similar coating prepared using silica in place of the polymethacrylate beads is also over 0.40.

In a conventional type of "blocking" test, a simulated film pack consisting of eight pieces (4" x 3½") of negatives (containing a conventional silver halide emulsion on the side of the sheeting away from the bead-carbon coating) are stacked together, in an orderly back-to-face repeating manner. The resulting stack of negatives is held at 90° F. and 90% relative humidity for at least 20 hours. Following this treatment the stack of negatives is equilibrated under ambient conditions and tested for "blocking." Negatives having acceptable blocking characteristics still slide freely over each other without visibly marring their emulsion surfaces. Otherwise the emulsions are abraded or even peeled away from the film base. The coating described in Example 1, above has excellent "blocking" characteristics by this test.

White coating

In certain end use applications of this invention there is a distinct advantage in having a uniform, very white layer or coating of titanium dioxide pigment between the light sensitive layer and the light impermeable film base, because the use thereof makes it possible to effectively utilize significantly shorter exposure times than would otherwise be possible without utilizing an extremely sensitive emulsion. Thus, exposure of the light sensitive material in the emulsion coating is accomplished not only by the light that strikes the emulsion as it comes through the lens system of the camera, but also by that portion of the light that is reflected back from the white layer (between the emulsion and the light impermeable film base). For proper utilization of this factor, then, the white layer must be uniformly spread over the usually black film base, and it must be of sufficiently small particle size to uniformly reflect the light back through the emulsion layer without diffusing it excessively. Useful particles of titanium dioxide, then, must have diameters below about 50 microns (generaly the smaller the better), and preferably should have average diameters (at their largest measurement) within the range of from about 15 millimicrons to about 15 microns.

In order to coat (and dry) one or more of these white layers or coatings (which can be applied over one or more subbing layers, if desired) onto the light impermeable film base, it was discovered that the conventional technique of utilizing a fairly high ratio of binder to pigment (above about 1:1, for example) was not satisfactory. Thus, the use of such high binder to pigment ratios resulted in coating suspensions (pigment, cellulose nitrate binder and solvent) having viscosities that are too high to be used to coat uniform layers of the material at commercially feasible rates. It also results in the production of non-uniform, crazed coatings because of difficulties in removal of solvent from such coatings. It has now been discovered that white coatings having the necessary degree of uniformity and smoothness, and also having excellent drying characteristics, can be laid down, provided:

(a) That the ratio of binder to titanium dioxide pigment be at most about 1:4; and (b) That the pigment binder "solids" (non-volatile at 250° F.) portion of the "white" coating composition be at most about 35 weight percent (and preferably between about 15 and about 25 weight percent) of the total coating composition.

For example, a particularly preferred "white" coating composition contains the following,

| Material: | Parts, percent |
|---|---|
| Titanium dioxide pigment | 17.5 |
| ½ second cellulose nitrate | 3.4 |
| Acetone | 23.0 |
| Methyl cellulosolve | 8.0 |
| Ethylene chloride | 5.0 |
| Methyl alcohol, balance to 100%. | |

Actually, any mixture of organic solvents (boiling below about 250° F.) in which the low viscosity cellulose nitrate is soluble can be utilized; the particular mixture being determined by the particular recovery and separation equipment available to the manufacturer, and sometimes upon the properties of other minor ingredients that can also be present in these useful "white" coating compositions. Therefore, the criticality with respect to the use of such "white" coating compositions relates to the ratio of binder to pigment and the ratio of solids to solvent.

EXAMPLE 2

The preferred "white" coating composition detailed above (that has been milled in a conventional high intensity shear type mill after the ingredients are intermixed) is coated onto a black (optical density greater than 7 through the visible light region) sheet of conventional cellulose acetate film base at a rate of 24 pounds of "white" coating per 1000 square feet of sheeting.

This coated sheet is then dried for two minutes at 250° F. by passing the sheet through a conventional sheet drying oven. The resulting white coating is smooth, uniform, and strikingly white. It passes the necessary adhesion test (that it resist completely removal by the direct stripping therefrom of a strip of conventional pressure sensitive adhesive tape, such as Scotch brand tape.) Considering the extremely small amount of binder in the white coating, such excellent adhesive characteristics of the coating are indeed surprising.

When a typical light sensitive emulsion (such as, for example, a gelatino-silver halide emulsion) is to be coated onto the "white" coated sheeting of the present invention, it is generally desirable to first apply at least one conventional subbing layer (such as the conventional hardened gelatin-cellulose nitrate subbing layers described in U.S. Pat. 2,271,228 and illustrated in the figures of that patent). Such subbing layers are well known to the skilled artisan and need not be described in detail herein.

Then, onto the subbed "white" coating is placed the light sensitive emulsion layer. Here, too, no details need be given herein because any light sensitive emulsion can be utilized successfully in the manufacture of the sensitized film articles of this invention, and many light sensitive emulsions are known to the ordinarily skilled artisan. Similarly conventional, well known processes for applying the various coating compositions in the manufacture of the various articles of this invention can be utlized.

What is claimed is:

1. An article of manufacture comprised of
   (1) polymeric film base sheet that is substantially impermeable to visible light,
   (2) on one surface of said film base sheet, a low-friction, anti-blocking, antistatic coating consisting essentially of, by weight,
      (a) from about 30 to about 55 percent of substantially spherical, polymeric beads having an average diameter of from about 0.5 to about 25 microns; said beads being substantially insoluble in a 30:70 by weight mixture of acetone and water;
      (b) from about 10 to about 33 percent of low viscosity cellulose nitrate having an intrinsic viscosity in acetone at 25° C. of from about 0.4 to about 1.5; and
      (c) from about 25 to about 60 percent of finely divided carbon black, and
   (3) on the other surface of said film base sheet a white uniform coating comprised of, by weight,
      (a) from about 10 to about 25 parts of finely devided titanium dioxide pigment, and
      (b) from about 2 to about 8 parts of low viscosity cellulose nitrate; said low viscosity cellulose nitrate having an intrinsic viscosity in acetone at 25° C. of from about 0.4 to about 1.5, and coated on said white uniform coating (i) a gelatin-cellulose nitrate sub and (ii) a layer of a light sensitive emulsion.

References Cited

UNITED STATES PATENTS

| 3,222,178 | 12/1965 | Nadeau et al. | |
| 2,327,828 | 8/1943 | Simmons. | |
| 3,295,979 | 1/1967 | Secrist | 96—87 |
| 3,269,252 | 8/1966 | Keyser et al. | 96—87 |
| 2,271,234 | 12/1942 | Staud et al. | |

RONALD H. SMITH, Primary Examiner

U.S. Cl. X.R.

96—84